(12) United States Patent
Fetta et al.

(10) Patent No.: US 9,552,271 B1
(45) Date of Patent: Jan. 24, 2017

(54) ENHANCED DISPATCH FOR INTEGRATED MODULAR AVIONICS SOLUTIONS SYSTEM AND RELATED METHOD

(71) Applicants: Jeffery E. Fetta, Cedar Rapids, IA (US); Eric N. Anderson, Cedar Rapids, IA (US)

(72) Inventors: Jeffery E. Fetta, Cedar Rapids, IA (US); Eric N. Anderson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 134 days.

(21) Appl. No.: 14/298,275

(22) Filed: Jun. 6, 2014

(51) Int. Cl.
*G06F 11/00* (2006.01)
*G06F 11/30* (2006.01)
*G06F 11/14* (2006.01)
*G06F 11/07* (2006.01)

(52) U.S. Cl.
CPC ....... *G06F 11/3013* (2013.01); *G06F 11/0739* (2013.01); *G06F 11/143* (2013.01); *G06F 11/1425* (2013.01); *G06F 11/1428* (2013.01)

(58) Field of Classification Search
CPC .............. G06F 11/0739; G06F 11/1425; G06F 11/1428; G06F 11/143; G06F 11/3013
See application file for complete search history.

(56) References Cited

U.S. PATENT DOCUMENTS

| | | | | |
|---|---|---|---|---|
| 7,941,248 B1* | 5/2011 | Tsamis | ................. | G08G 5/0013 701/3 |
| 8,452,465 B1* | 5/2013 | Sinha | ................. | G05B 19/0428 365/189.08 |
| 2003/0033178 A1* | 2/2003 | Black | ..................... | G06Q 10/06 705/7.22 |
| 2004/0111197 A1* | 6/2004 | Kipersztok | ........... | B64F 5/0045 701/31.6 |
| 2004/0176887 A1* | 9/2004 | Kent | ...................... | G07C 5/008 701/29.5 |
| 2007/0008188 A1* | 1/2007 | Firra | ....................... | B64D 43/00 340/973 |
| 2009/0326738 A1* | 12/2009 | Ferro | .................. | G06F 11/2257 701/3 |
| 2010/0036547 A1* | 2/2010 | Myers | .................. | G08G 5/0034 701/3 |
| 2010/0292869 A1* | 11/2010 | Riley | ................... | G08G 5/0043 701/3 |

(Continued)

*Primary Examiner* — Thomas G Black
*Assistant Examiner* — Peter D Nolan
(74) *Attorney, Agent, or Firm* — Angel N. Gerzhikov; Donna P. Suchy; Daniel M. Barbieri

(57) ABSTRACT

A system and method for enhanced dispatch of an operationally critical system is disclosed. The method receives a minimum equipment list associated with the system including a plurality of dispatch critical applications with at least one dispatch critical application instance. A rules set determines a plurality of schedules of the dispatch critical application instances in compliance with the minimum equipment list, each schedule associates a specific processing resource with a specific dispatch critical application instance. A monitor tracks the availability of each dispatch critical application instance and, should one or more instanced become unavailable, the method implements an alternate schedule of dispatch critical application instances in accordance with the rules set and the minimum equipment list.

17 Claims, 11 Drawing Sheets

(56) References Cited

U.S. PATENT DOCUMENTS

2010/0318834 A1* 12/2010 Planche .............. G06F 11/2025
　　　　　　　　　　　　　　　　　　　　　　714/3
2012/0078463 A1*  3/2012 Gros ...................... G07C 5/008
　　　　　　　　　　　　　　　　　　　　　　701/31.4
2014/0157041 A1*  6/2014 Danielsson ......... G06F 11/2041
　　　　　　　　　　　　　　　　　　　　　　714/4.2

* cited by examiner

|  | Allocations by Processor | | | | Dispatch Qtys | | Instances After Loss of Processor | | | |
| --- | --- | --- | --- | --- | --- | --- | --- | --- | --- | --- |
|  | 1 | 2 | 3 | 4 | Nominal | Required | 1 | 2 | 3 | 4 |
| I/O | x | x | x | x | 4 | 3 | 3 | 3 | 3 | 3 |
| Engine Displays (ENG) | x |  | x | x | 3 | 3 | 2 | 3 | 2 | 2 |
| Crew Alerting | x | x | x | x | 4 | 3 | 3 | 3 | 3 | 3 |
| Display Manager | x | x | x | x | 4 | 3 | 3 | 3 | 3 | 3 |
| *Map Display* | x |  |  | x | 2 | 2 | 1 | 2 | 2 | 1 |
| PFD | x | x |  | x | 3 | 3 | 2 | 2 | 3 | 2 |
| HUD | x | x | x | x | 3 | 3 | 2 | 2 | 3 | 2 |
| System Information | x |  | x | x | 3 | 1 | 2 | 3 | 2 | 2 |
| IFE |  | x |  | x | 2 | 0 | 2 | 1 | 2 | 1 |

FIG. 1

ENHANCED DISPATCH FOR INTEGRATED MODULAR AVIONICS SOLUTIONS SYSTEM AND RELATED METHOD

FIELD OF THE INVENTION

The present invention relates generally to requirements for a vehicle to properly begin operation within constraints of a minimum list of equipment under which the vehicle operator may perform. More particularly, embodiments of the present invention relate to a system and related method providing a static allocation of resources to affect acceptable dispatch should one listed system become inoperative or degraded.

BACKGROUND

In the interest of safety, regulations may require a minimum level of equipment functionality before an aircraft may legally dispatch under the regulation. For example, in the US, Federal Aviation Regulation (FAR) 14 CFR Part 121 requires a Master Minimum Equipment List (MMEL) be satisfied before an aircraft may dispatch (e.g., push back from a gate in preparation for departure). Should one item on the MMEL be inoperative, it would be counter to 14 CFR 121 for a certificate holder to allow the aircraft to dispatch.

Of these items of equipment functionality, some non-critical items may be deferred for later maintenance allowing dispatch of the aircraft without the inoperative item. Other items may be critical to aircraft safety requiring operational status before a legal dispatch. For example, an aircraft may defer to later maintenance a relatively minor item such as a single fuel pump while an item critical to safety such as a flight control computer may be required to be operational before dispatch is approved.

Some critical equipment required for dispatch may include an instance of a software application. For example, some aircraft configurations may require at least three instances of the processor generated Primary Flight Display (PFD) application operating and available before dispatch is authorized. One solution to ensure at least three instances of the PFD are available may include an additional processor devoted to maintaining a redundant copy of the critical instance. This solution however, may add additional unnecessary and undesirable cost, weight, and power requirements to the avionics system.

In some aircraft, due to limitations in Hardware or Processor availability, a minimum number of critical required instances of an application and maximum number of available instances of the application may be equal. This equality allows zero room for error since one failure may lead to a time consuming maintenance action and an unnecessary risk to a timely dispatch.

Many critical systems prohibit the dynamic reallocation of resources. Such systems may require a high level of availability and a scripted and preplanned allocation of processing resources. For example, an aircraft operating under a strict safety rules set may not perform a dynamic reallocation of processing of resources.

One or more schedules with static or fixed execution times for each partition or application can be shown to be deterministically safe via analysis. This may be required as part of a system compliance verification.

While theoretically a similar analysis could be performed for dynamic scheduling algorithms, the complexity of the effort increases rapidly as more resources, applications and alternatives are included in the analysis. Practically speaking it may be cost prohibitive to verify the temporal behavior of critical systems with dynamic reallocation of processing resources.

Traditionally, a reallocation of Processor resources from a non-critical application to a critical application may require a time consuming maintenance effort. This reallocation may traditionally include moving Line Replaceable Units (LRU) and/or Line Replaceable Modules (LRM) from one physical location to another. This hardware reallocation a movement may likely undesirably delay the timely dispatch.

Therefore, a need remains for timely and static allocation of processing resources should one required instance of a critical application become inoperative. This timely allocation may direct Processor resources within the constraints of a regulation of a governing body and within desired MMEL requirements allowing timely dispatch despite failure of a critical item.

SUMMARY

Accordingly, one embodiment of the inventive concepts disclosed herein is directed to a method for enhanced dispatch of a vehicle, comprising: receiving a minimum equipment list associated with the vehicle, the minimum equipment list including a plurality of dispatch critical applications, each of the plurality of dispatch critical applications including at least one dispatch critical application instance, receiving a rules set determinative of a first schedule of dispatch critical application instances and at least one second schedule of dispatch critical application instances, the rules set in compliance with the minimum equipment list, monitoring a plurality of available processing resources, the plurality of available processing resources operating onboard the vehicle and providing the at least one dispatch critical application instance, each one of the first schedule and the second schedule associates each dispatch critical application instance with a specific one of the plurality of available processing resources, monitoring an availability of the at least one dispatch critical application instance, the availability associated with the first schedule of application instances, the availability including an availability of the available processing resource associated with the dispatch critical application instance, determining a non-availability of one of the at least one dispatch critical application instance and the plurality of available processing resources, the determining based on the monitoring, determining a phase of operations of the vehicle, the determining including determining whether the phase of operations is one of critical and non-critical, enacting the second schedule of application instances in accordance with the rules set if the determining results in a non-critical phase of operations and if the determining results in a non-availability of at least one dispatch critical application instance.

In a further aspect, the inventive concepts disclosed herein may include a method wherein the dispatch critical application instance further comprises at least one of a primary flight display, a systems management display, a stores management display, a navigation display, an engine display, a crew alerting system, a flight envelope protection system, a flight control system, a flight augmentation system, a flight management system, a navigation system, and a heads up display.

An additional embodiment of the inventive concepts disclosed herein may include a method wherein monitoring a plurality of available processing resources and monitoring an availability of the at least one dispatch critical application instance further comprises one of a health management system, a scheduling system, and a power management system and wherein the first and second schedules of dispatch critical application instances further comprise a specific dispatch critical application instance associated with a specific available processing resource.

In a further aspect, the inventive concepts disclosed herein may include a method wherein the non-critical phase of operations is one of: when the vehicle is stationary, above 10,000 feet mean sea level, over friendly territory, and before a secure connection is established and wherein the critical phase of operations is one of: from an aircraft block out to an aircraft block in, below 10,000 feet mean sea level, over hostile territory, in motion under power of the vehicle, and after a secure connection has been established.

An additional embodiment of the inventive concepts disclosed herein may include a method wherein enacting the second schedule of application instances in accordance with the rules set further comprises a notification to a maintenance provider.

An additional embodiment of the inventive concepts disclosed herein may include a system for enhanced dispatch of a vehicle, comprising: a plurality of dispatch critical application instances, each of the dispatch critical application instances associated with a critical application, a plurality of processing modules configured for generating each of the plurality of dispatch critical application instances, a monitor configured for monitoring an operational status of the available processing resources and the dispatch critical application instances, the monitor further configured for producing a monitor signal, the monitor input based on the operational status, a minimum equipment list associated with the vehicle, the minimum equipment list including the plurality of dispatch critical applications, a first schedule of dispatch critical application instances associating at least one dispatch critical application instance with at least one processing module, at least one second schedule of dispatch critical application instances associating at least one dispatch critical application instance with at least one processing module, the at least one second schedule dissimilar from the first schedule, a processor configured for: receiving the monitor signal, receiving a vehicle input, determining an operational status of the vehicle based on the vehicle input, the operational status one of: a critical phase and a non-critical phase, enacting the second schedule of dispatch critical application instances if the monitor input reveals a non-operational status of at least one dispatch critical application instance and if the vehicle input reveals a non-critical phase.

An additional embodiment of the inventive concepts disclosed herein may include a method for reliable operation of a system, comprising: receiving a minimum equipment list associated with the system, the minimum equipment list including a plurality of operationally critical applications, each of the plurality of operationally critical applications including at least one operationally critical application instance, receiving a rules set determinative of a first schedule of operationally critical application instances and at least one second schedule of operationally critical application instances, the rules set in compliance with the minimum equipment list, monitoring an availability of the at least one operationally critical application instance, the at least one operationally critical application instance generated by a plurality of available processing resources, the plurality of available processing resources associated with the system, each one of the first schedule and the second schedule associates each operationally critical application instance with a specific one of the plurality of available processing resources, determining a non-availability of one of the at least one operationally critical application instance, the determining based on the monitoring, determining a phase of operations of the system, the determining including determining whether the phase of operations is one of critical and non-critical, enacting the second schedule of application instances in accordance with the rules set if the determining results in a non-critical phase of operations and if the determining results in a non-availability of at least one operationally critical application instance.

In a further aspect, the inventive concepts disclosed herein may include a method wherein the dispatch critical application instance further comprises at least one mission critical element of an operation of the system and wherein monitoring an availability of the at least one operationally critical application instance further comprises one of a health management system, a scheduling system, and a power management system.

An additional embodiment of the inventive concepts disclosed herein may include a method wherein the phase of operations of the system is based on a mission of the system and wherein the second schedule of application instances is a predefined, pre run-time schedule of application instances.

An additional embodiment of the inventive concepts disclosed herein may include a method wherein the at least one operationally critical application instance is required for mission success.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is a diagram of an exemplary allocation of processing modules associated with an embodiment of the present invention;

DETAILED DESCRIPTION

Figure 2:
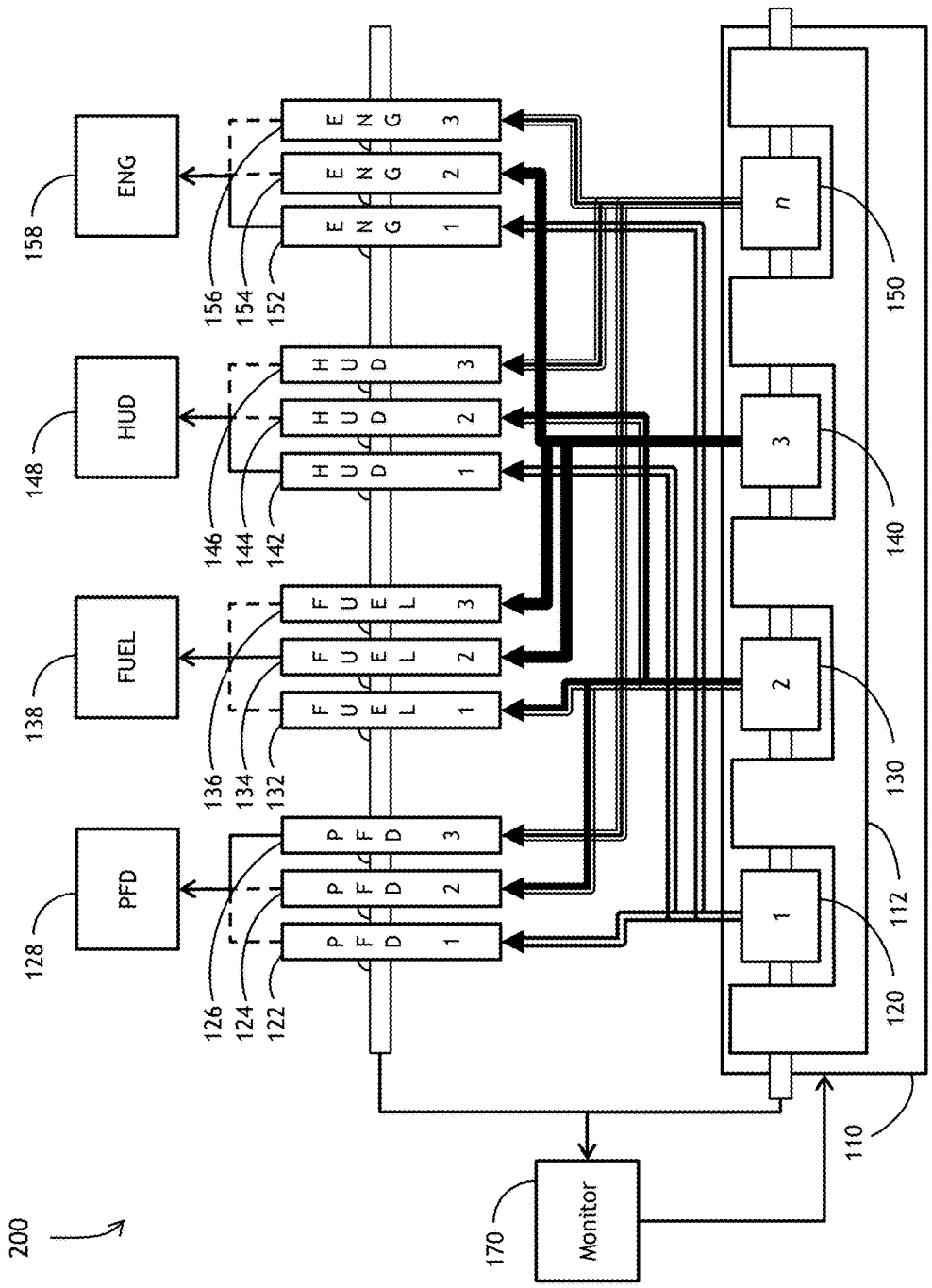
FIG. 2 is a diagram of an exemplary monitor of processing modules in accordance with an embodiment of the present invention.

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention may provide a system and related method to minimize Integrated Modular Avionics (IMA)/computing resource consumption for nominal application allocation. Embodiments herein may meet dispatch requirements without MMEL or Airline Maintenance intervention after loss of at least one LRM or computing resource. In embodiments, no additional certification effort or analyses may be required to support the enhanced dispatch capability.

Embodiments of the present invention may monitor a hierarchy of dispatch critical application instances. Should one or more of the identified dispatch critical application instances become unusable or inoperative, the systems herein may command a previously defined alternate schedule of application instances selected at runtime in order to regain the critical application instance and thus, regain dispatch capability without maintenance action. Systems herein may define a rules based, vehicle specific, pre-defined set of conditions allowing for a static shift in functionality to regain the lost instance of the critical application.

Preferably, embodiments of the present invention may bring enhanced dispatch capabilities to existing systems without adding additional hardware to the system. For example, a regional aircraft configured with avionics hardware and software may require no additional hardware from current configurations to function with the additional capabilities of enhanced dispatch.

Referring to FIG. 1, a diagram of an exemplary allocation of processing modules associated with an embodiment of the present invention is shown. Application instances which are critical to dispatch may be a requirement of a specific manufacturers or a design team. Absent specific direction from an Original Equipment Manufacturer (OEM), a federal agency (e.g. Federal Aviation Administration (FAA)), or design team, embodiments of the present invention may receive an input concerning requirements for dispatch.

All items required for dispatch may be one input to systems described herein. Dispatch critical application instances may be a second more specific list of the items required for dispatch as indicated in FIG. 1 by an x in the column indicating which Processor may generate the instance. In embodiments, Processor number one (Processor 1) 120 may generate instances of Engine Displays (ENG) (e.g., Engine Indicating and Crew Alerting System (EICAS)) 158, PFD 128, and Heads Up Display (HUD) 148. Also, as indicated, three instances of the PFD are generated by Processor 2 120, Processor 3 130, and Processor n 150.

The "Dispatch Qtys" column indicates a number of instances of the application which are Nominal and Required for dispatch. In the case of the HUD 148, three instances of the HUD are Nominal and three are required for dispatch. As discussed above, with the HUD 148, the PFD 128, and the ENG 158, there are three instances required and just three instances available during normal operation.

The "After Loss of" columns indicate a number of instances available should one of the Processors fail. In embodiments, should Processor 1 120 fail during preflight, only two instances of ENG 158, PFD 128, and HUD 148 are available. Dispatch under these conditions may be prohibited requiring a maintenance action to physically replace Processor 1.

Referring to FIG. 2, a diagram of an exemplary monitor of processing modules in accordance with an embodiment of the present invention is shown. Computing Resource 110 may provide necessary processing for a plurality of onboard applications. Preferably, processor resources may be physically separated 112 to more accurately distribute processor capabilities to each individual application. In this exemplary configuration, computing resource 110 may provide instances of PFD 128, FUEL 138, HUD 148 and ENG 158 for display to an operator. Here, Processor 1 120 is providing instances for PFD1 122, HUD1 142, and ENG1 152; Processor 2 is providing instances for PFD2 124, FUEL1 132, and HUD2 144; Processor 3 is providing instances for FUEL1 134, FUEL2 136, and ENG2 154; and Processor n 150 is providing instances for PFD3 126, HUD3 146, and ENG3 156.

In embodiments, partitioning may be provided by an application standard such as ARINC 653. This partitioning allows each application to be logically independent of the other applications and instances within a processor or computing resource. Such a standard may include an ability to partition resources as well as determine which resource may generate a specific instance of an application. System 200 may control in advance, through partitioning and a specific and controlled set of scheduling rules, each instance of each critical application required for dispatch.

Of each instance of the application, system 200 may determine which instance is used for crewmember display. In embodiments, computing resource 110 may determine PFD display 128 is to be powered by Processor n 150 via instance PFD3 126 to enable accurate display of the primary flight data. Additionally, HUD 148 may be powered by 1 120 and instance HUD1 142.

System 200 may employ a monitor 170 to continuously reference the status of each Processor (1-4), the status of each of the instances of non-critical and dispatch critical applications. In embodiments, monitor 170 may analyze whether dispatch critical application instances PFD1 122, PFD2 124, and PFD3 126 are in operation as well as non-critical instances FUEL1 132-FUEL2 136. As a failure of one of the Processor may generate a loss of capability, monitor 170 may recognize the failure and react to ensure each dispatch critical application instance is operational for dispatch. In one embodiment, monitor 170 may comprise a software based health monitor tasked with measuring and recording the health of each onboard application.

Figure 3:
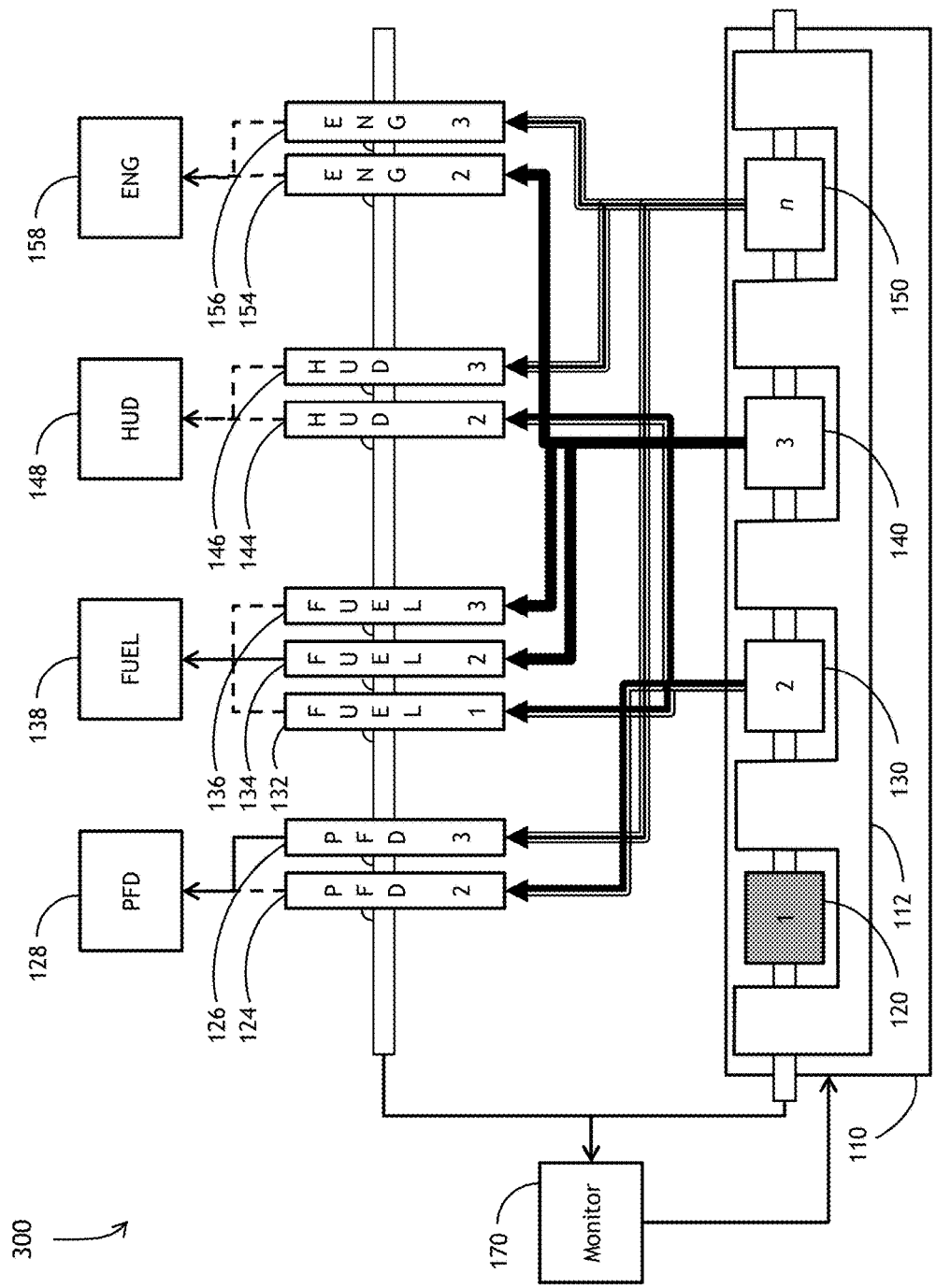
FIG. 3 is a diagram of a Processor failure recognizable by an embodiment of the present invention.

Referring to FIG. 3, a diagram 300 of a Processor failure recognizable by an embodiment of the present invention is shown. Here, Processor 1 has failed where system 200 via monitor 170 recognizes that failure since each of the instances 1 generated is absent. In this case, before failure, Processor 1 120 was generating PFD1 122, HUD1 142, and ENG1 152 so Processor 120 must revert to an alternate schedule of generation to fulfill the required dispatch critical application instances.

Figure 4:
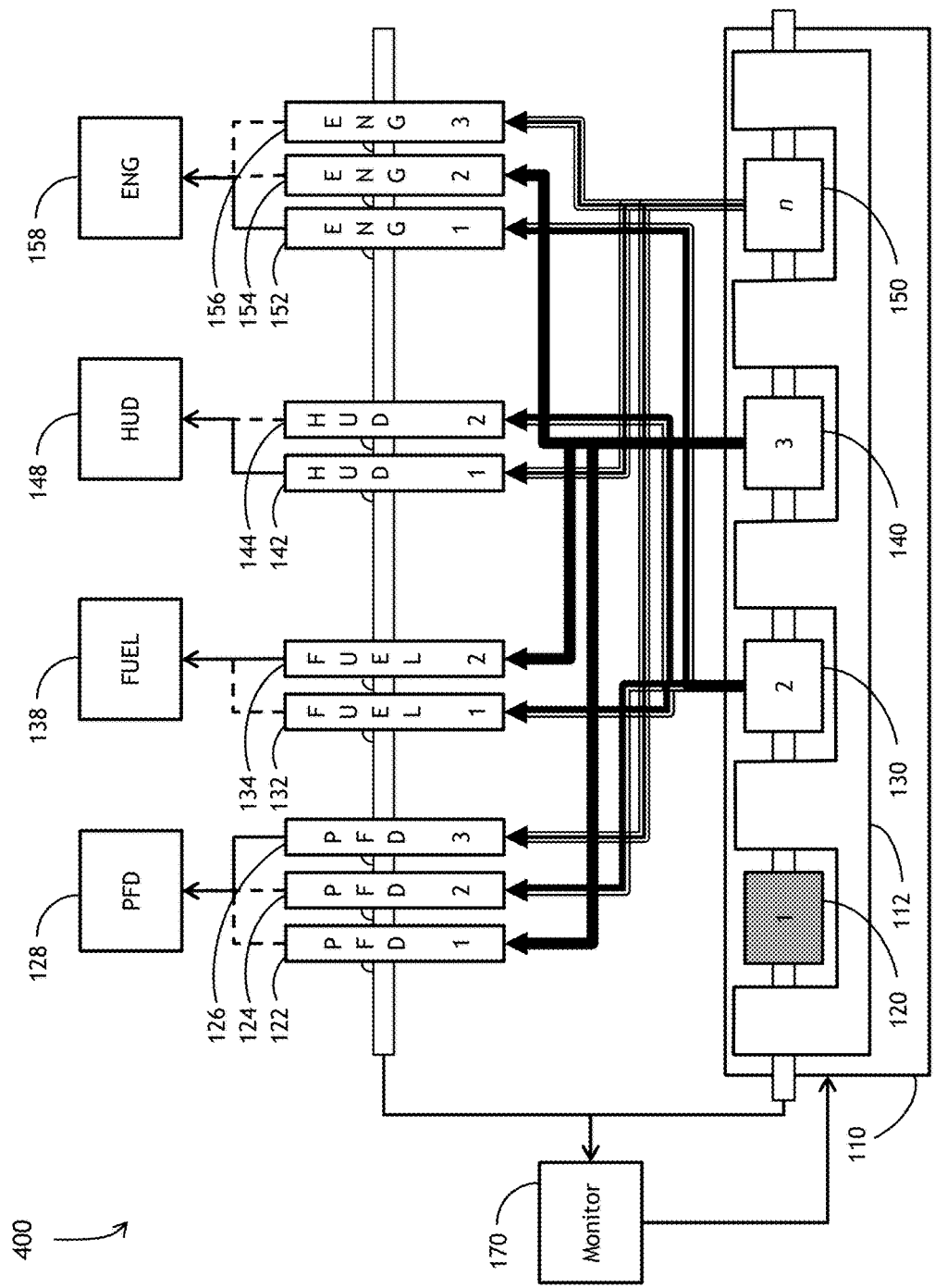
FIG. 4 is an diagram of an alternate schedule of processing modules exemplary of an embodiment of the present invention.

Referring to FIG. 4, a diagram 400 of an alternate schedule of processing modules exemplary of an embodiment of the present invention is shown. In compliance with the alternate schedule, system 200 may direct computing resource 110 to generate PFD1 122 via Processor 3 140, HUD1 142 via Processor n 150, and ENG1 152 via Processor 2 130. In this manner, system 200 may implement the alternate schedule of dispatch critical application instances to ensure the vehicle is ready for safe dispatch.

Preferably, embodiments of the present invention may limit implementation of the second schedule to specific time constraints. Some embodiments may limit system 200 operation to static periods prior to dispatch when the aircraft is not in flight. In embodiments, a PFD 122 instance may become inoperative during preflight of an aircraft. System 200 may operate to implement a second schedule of PFD instances commanding resource allocation to restore the lost instance of the PFD and allow for timely dispatch.

In addition to a time constraint limitation, system 200 may limit operation by aircraft type to a specific alternate schedule of Processor instances of the application. In embodiments, system 200 may limit the alternate schedule of dispatch critical application instances to those applications listed by a higher authority to be required for dispatch. This imitation may include, for example, a transport category commercial jet (e.g., B-787) PFD, HUD, and ENG Displays. For a military fighter type aircraft (e.g. an F-16), the critical application may include a HUD, a weapons system, and Stores Management System. For each specific vehicle, system 200 may receive and comply with a specific rules set defining critical applications necessary for mission/flight success and the associated Processor responsible for generating the replacement instance.

System 200 static generation of the second/alternate schedule may be preferably pre-defined within the constraints of the specific rules set to reallocate resources from a first known configuration to a second known configuration. In embodiments, a first deterministic rules set may list the Inflight Entertainment (IFE) system 168 as a replacement application for HUD 148. Should one or more instance of the HUD 148 become inoperative, the Processor generating the IFE 168 will discontinue supporting the IFE generation and begin operation supporting the HUD application. Each static reallocation of processor support may be pre-defined within the constraints to limit a possible reduction in a safety margin.

Figure 5:
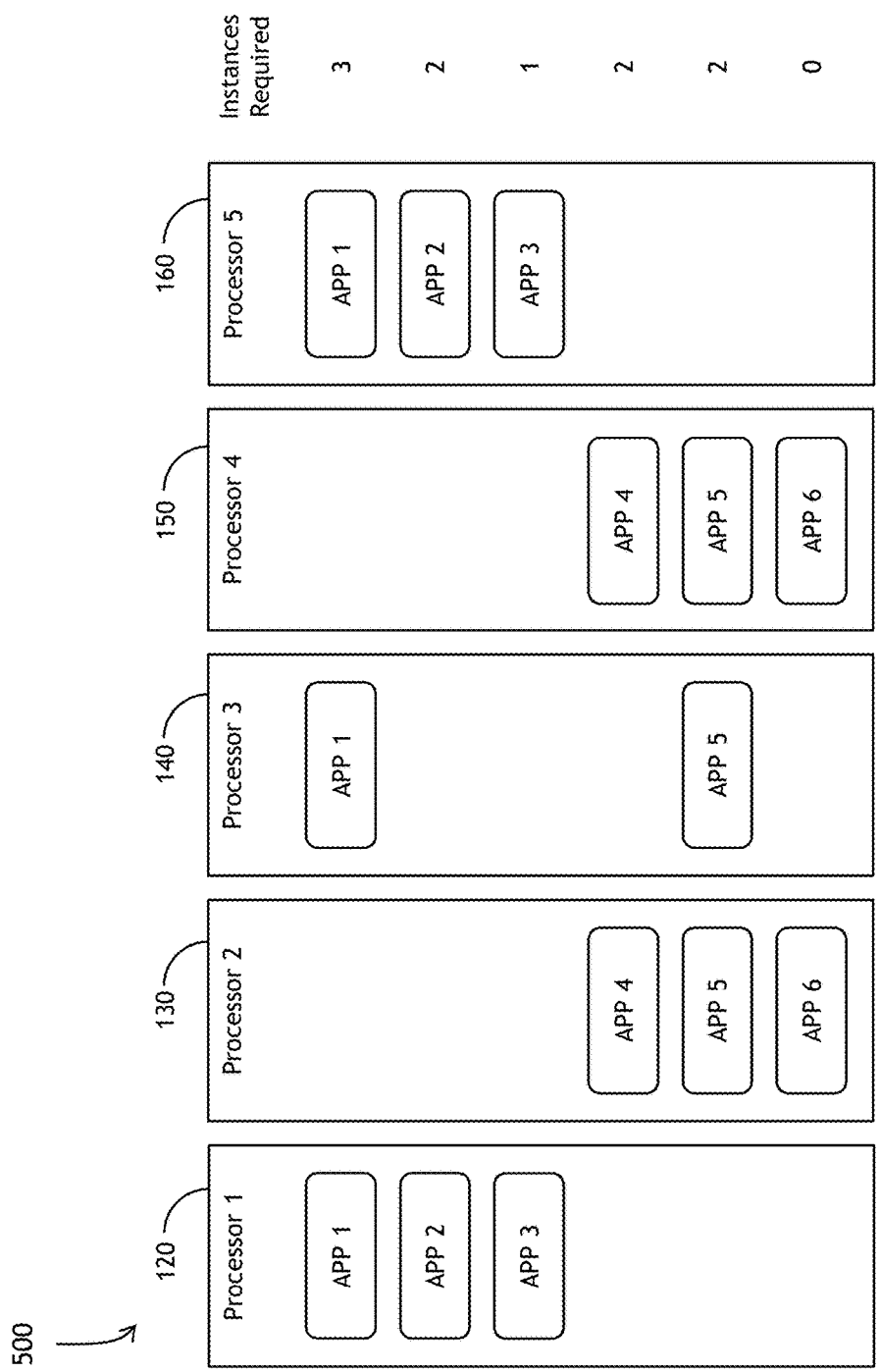
FIG. 5 is a diagram of a nominal configuration of Processors and applications monitored by one embodiment of the present invention.

Referring to FIG. 5, a diagram 500 of a nominal configuration of Processors and applications monitored by one embodiment of the present invention is shown. Exemplary Processors 120-170 may nominally support an exemplary six applications. Here, Processor n 150 from FIG. 4 is replaced by Processor 4 150 to continue with the clearly numbered processor elements. In this embodiment, each Processor may be limited to host (run) 3 applications at one time. As a whole, the system may require all six exemplary applications and a number of instances of each application as indicated under the "Instances Required" column for a proper and timely dispatch. As indicated, Processor 1 120 may host one instance of application 1, one instance of application 2, and one instance of application 3. Also, the system requires three instances of application 1, two instances of application 2, one instance of application 3, two instances of applications 4 and 5 and zero instances of application 6 prior to dispatch. As indicated, more instances of certain applications (e.g., APP5) may be available than are required for dispatch.

Figure 6:
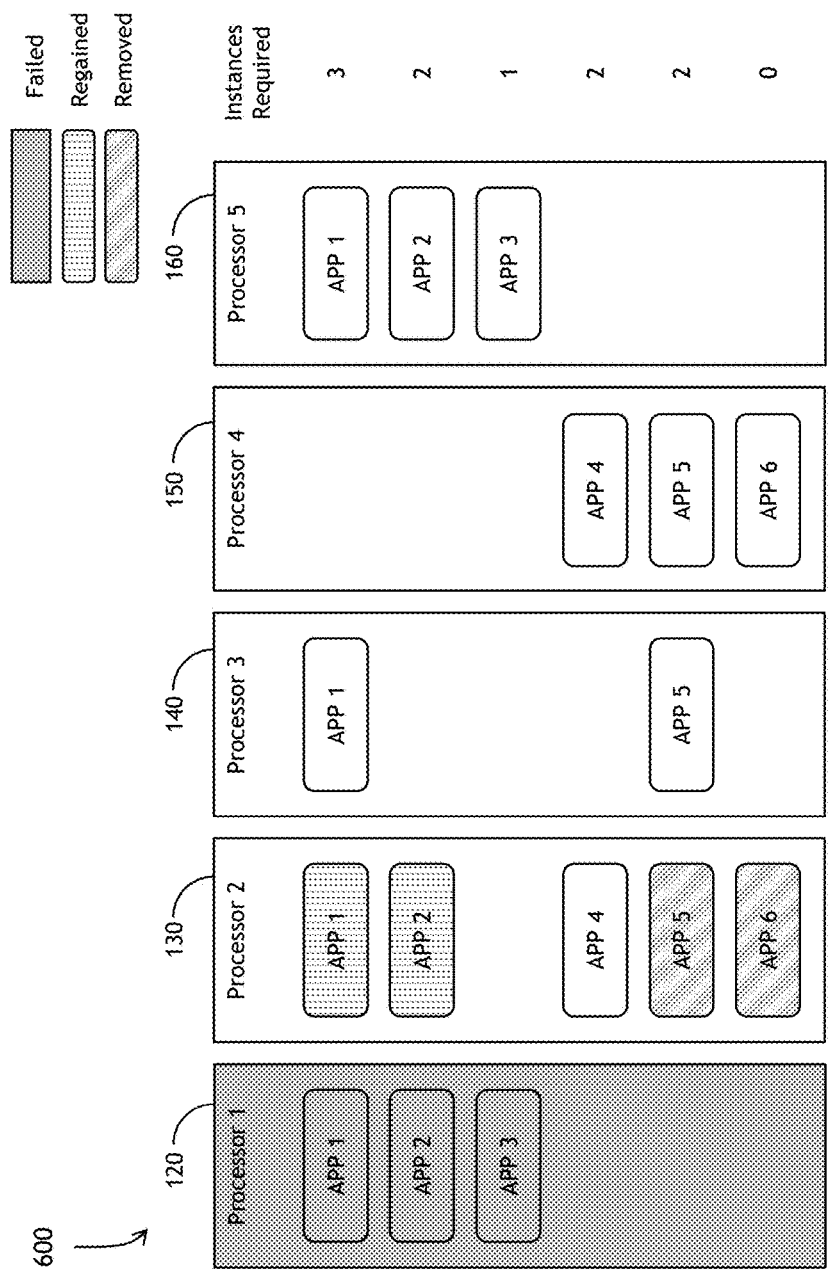
FIG. 6 is a diagram of an exemplary loss of Processor 1 in accordance with one embodiment of the present invention.

Referring to FIG. 6, a diagram 600 of an exemplary loss of Processor 1 in accordance with one embodiment of the present invention is shown. After a loss of Processor 1 120, the system as a whole loses each application instance provided by Processor 1 (single instances of applications 1, 2, and 3). Here, system 200 may remove unnecessary instances (APP 5, APP 6) from Processor 2 130 workload and add required instances APP 1 and APP 2. This static transition from a first known configuration to a second known configuration is deliberate and pre-defined.

Figure 7:
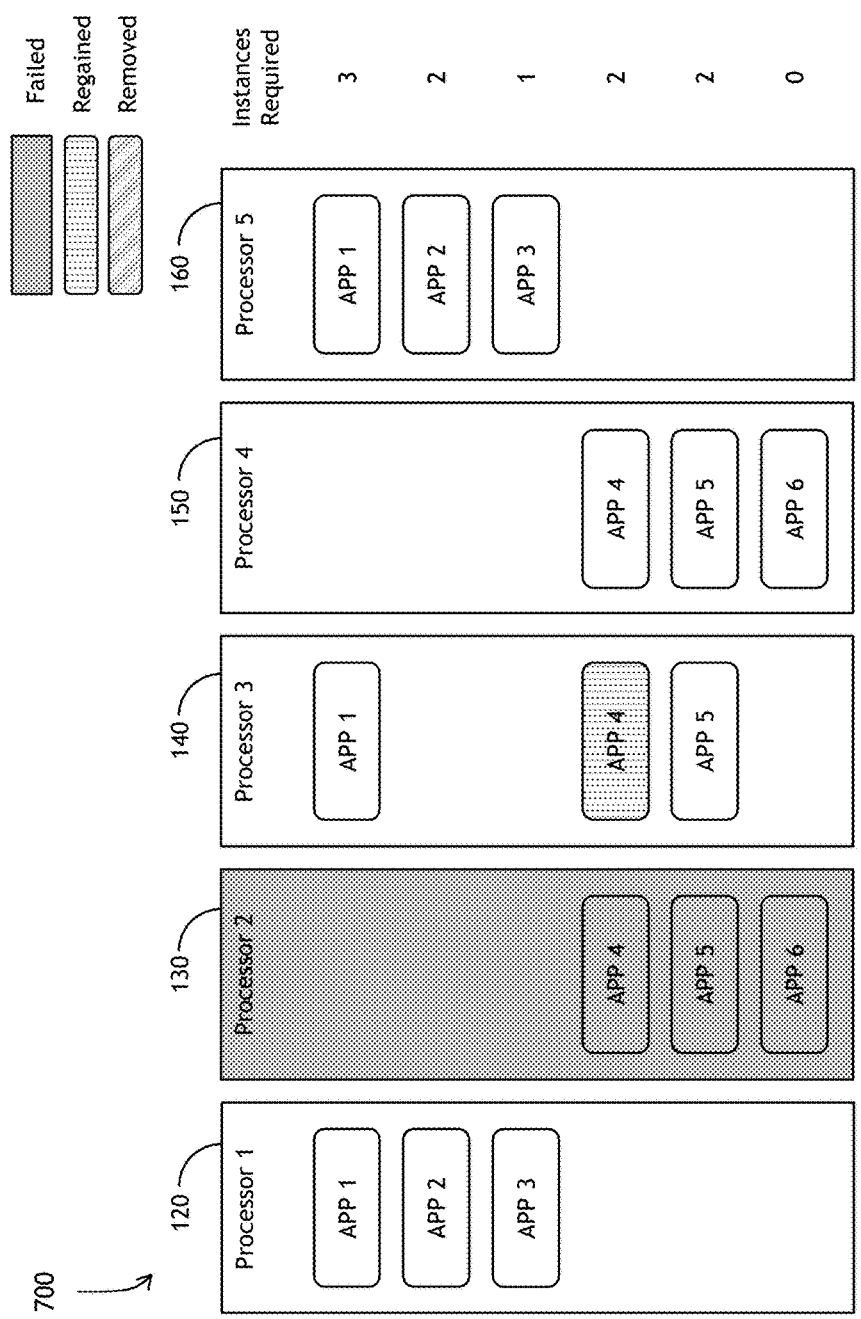
FIG. 7 a diagram of an exemplary loss of Processor 2 in accordance with one embodiment of the present invention.

Referring to FIG. 7, a diagram 700 of an exemplary loss of Processor 2 in accordance with one embodiment of the present invention is shown. After a loss of Processor 2 130, the system as a whole loses each application instance provided by Processor 2 (single instances of applications 4, 5, and 6). Here, system 200 may add an additional instance of APP 4 to Processor 3 140 to ensure there are sufficient instances of APP 4 (2 instances) to ensure dispatch requirements are met. As above, this static transition from a first known configuration to a second known pre-defined configuration is deliberate.

Figure 8:
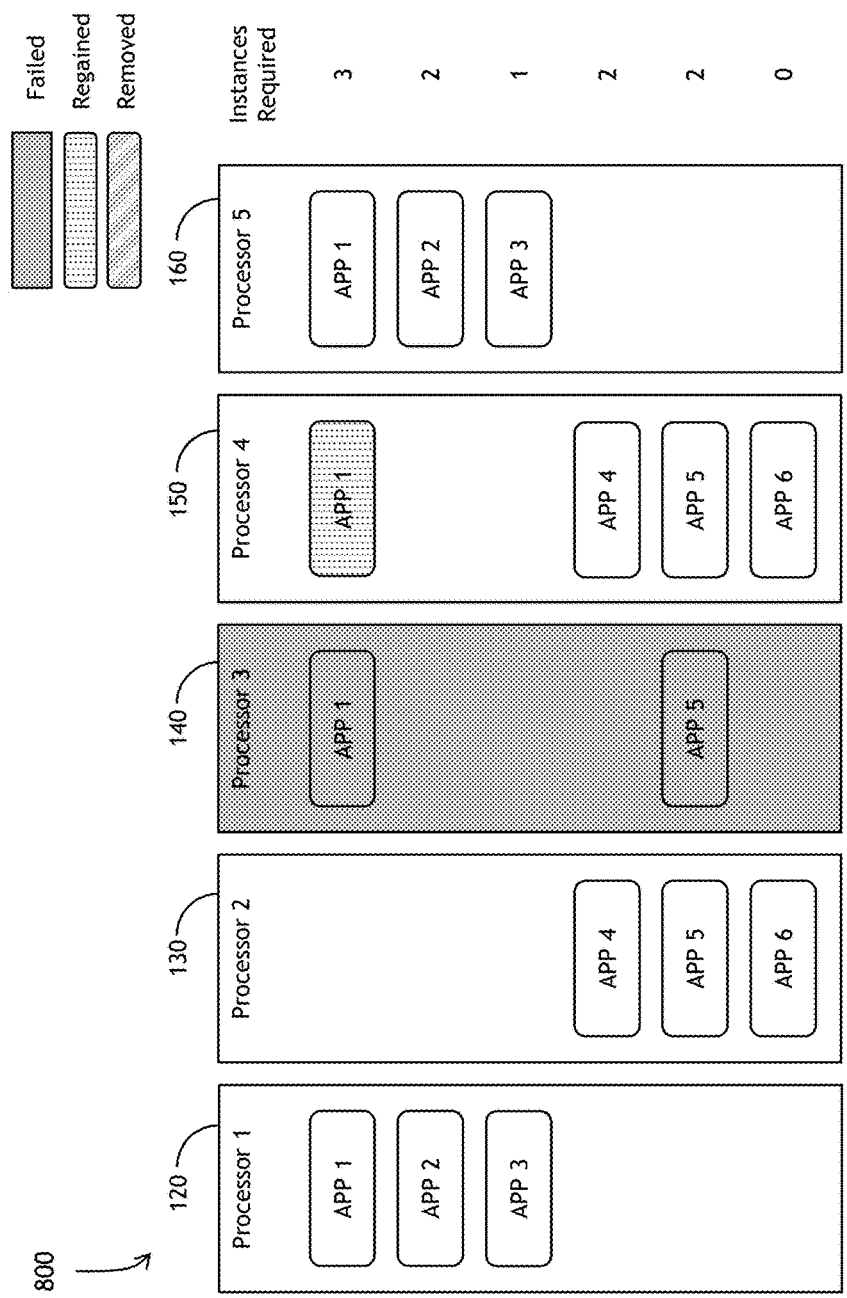
FIG. 8 is a diagram of an exemplary loss of Processor 3 in accordance with one embodiment of the present invention.

Referring to FIG. 8, a diagram 800 of an exemplary loss of Processor 3 in accordance with one embodiment of the present invention is shown. After a loss of Processor 3 140, the system as a whole loses each application instance provided by Processor 3 (single instances of applications 1 and 5). Here, system 200 may add an additional instance of APP 1 to Processor n 150 to ensure there are sufficient instances of APP 1 (3 instances) to ensure dispatch requirements are met. As above, this static transition from a first known configuration to a second known pre-defined configuration is deliberate.

Figure 9:
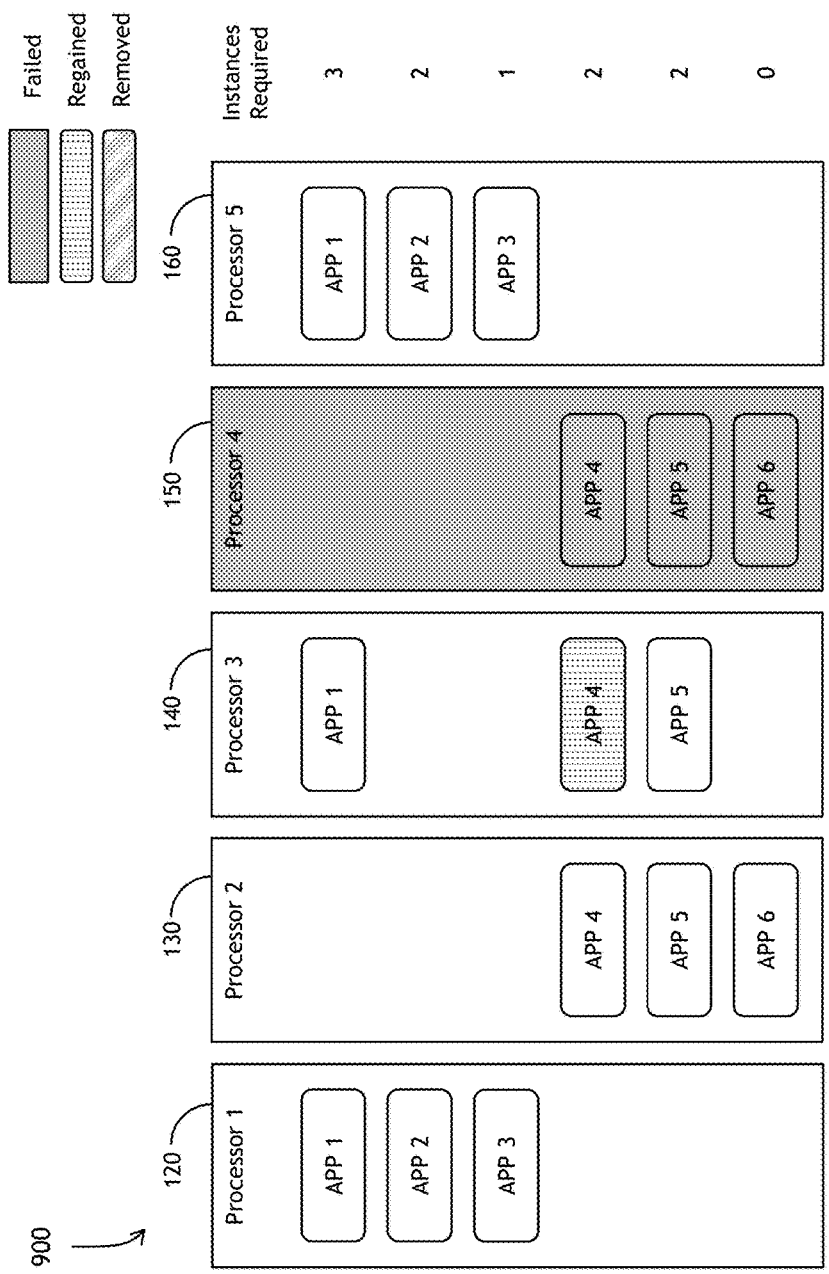
FIG. 9 is a diagram of an exemplary loss of Processor 4 in accordance with one embodiment of the present invention.

Referring to FIG. 9, a diagram 900 of an exemplary loss of Processor 4 in accordance with one embodiment of the present invention is shown. After a loss of Processor n 150, the system as a whole loses each application instance provided by Processor 4 (single instances of applications 4, 5, and 6). Here, system 200 may add an additional instance of APP 4 to Processor 3 140 to ensure there are sufficient instances of APP 4 (2 instances) to ensure dispatch requirements are met. As above, this static transition from a first known configuration to a second known pre-defined configuration is deliberate.

Figure 10:
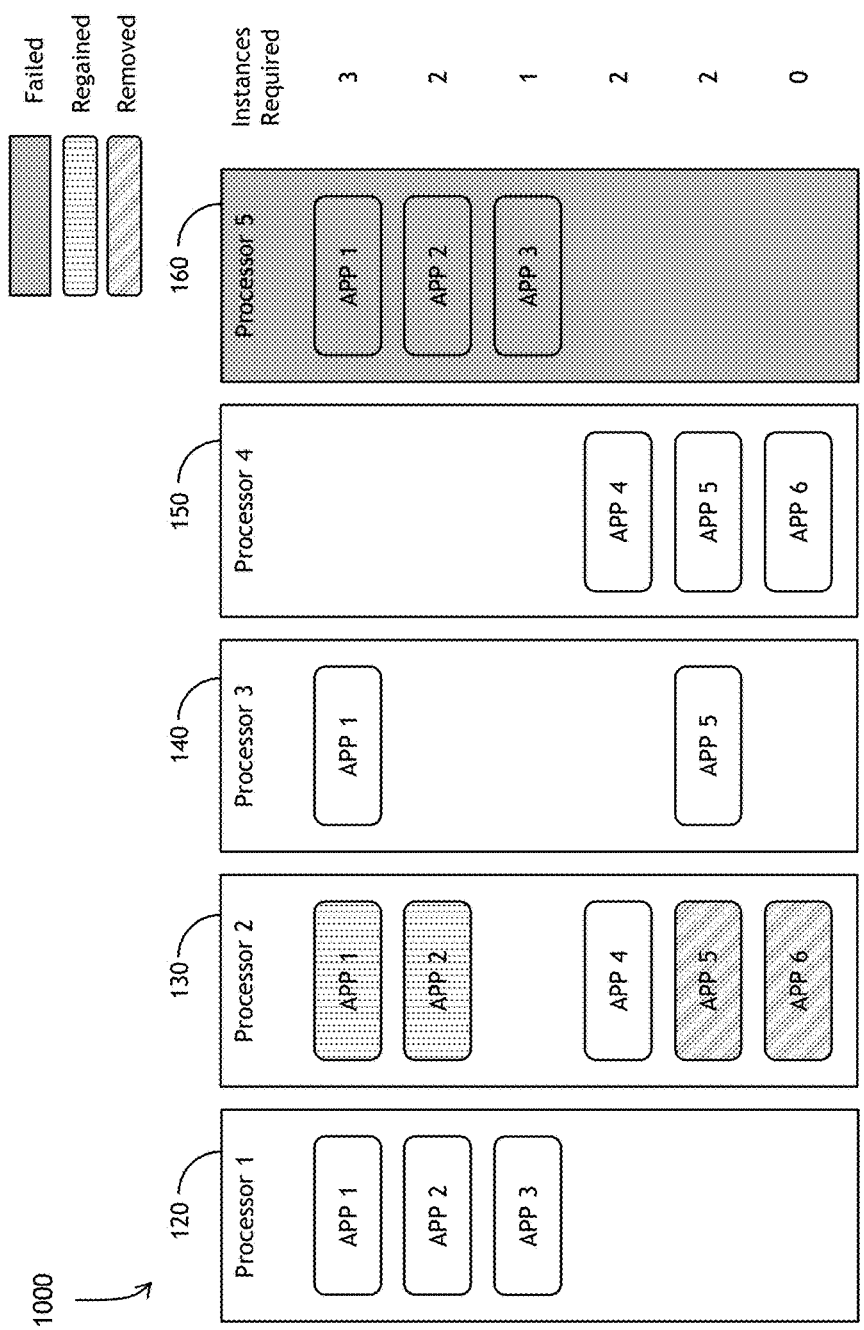
FIG. 10 is a diagram of exemplary loss of Processor 5 in accordance with one embodiment of the present invention.

Referring to FIG. 10, a diagram 1000 of exemplary loss of Processor 5 in accordance with one embodiment of the present invention is shown. Similar to a loss of Processor 1 120, after a loss of Processor 5 160, the system as a whole loses each application instance provided by Processor 5 (single instances of applications 1, 2, and 3). Here, system 200 may remove unnecessary instances (APP 5, APP 6) from Processor 2 130 workload and add required instances APP 1 and APP 2. As above, this static transition from a first known configuration to a second known pre-defined configuration is deliberate.

Some embodiments of the present invention may function in compliance with a specific certification rules of a regulation governing a specific class of Air Transport and Business and Regional aviation. For example, an air transport category aircraft may implement one embodiment of the present invention in compliance with a regulation such as the Federal Aviation Administration (FAA) aircraft equipment and operational authorizations MEL and Configuration Deviation Lists (CDL). Another embodiment of the present invention may operate in compliance with a Naval Air Training and Operating Procedures Standardization (NATOPS) directive and/or an Air Force Instruction (AFI) related to a military airframe.

Additional embodiments of the present invention may operate in a limited manner during non-critical operation of the vehicle. In embodiments, system 200 may implement a specific, limited schedule of instances during operation of the aircraft. In an additional example, system 200 may implement the second schedule while the aircraft is constrained to specific parameters such as in Visual Metrological Conditions (VMC) or in straight and level flight. One embodiment may operate only during flight over friendly territory before pre combat checks may be performed. Another embodiment may operate within specific geographical limitations (e.g., over friendly territory, above FL 100, during a low threat environment). In one embodiment, a required reconfiguration criteria may include operator selection (i.e. opt in to reconfigure when specific conditions are met). This option may provide flexibility to keep the operator engaged in (and understanding) the configuration of and changes to the system.

An additional embodiment of the present invention may function during non-critical phases of flight/operation. A critical phase of operation for one vehicle type may be distinct from a critical phase of operation for a second aircraft type. In embodiments, system 200 operations in an unmanned vehicle (UAV), a critical phase of flight may be separately defined from a critical phase of flight for a commercial aircraft. For the UAV, all phases of flight may be considered non-critical wherein the restoration of a hierarchical application may outweigh a momentary lack of awareness during system 200 alternate schedule implementation. For a passenger aircraft, a critical phase of flight may include all times from aircraft block out (leaving the departure gate) to aircraft block in (arriving at the arrival gate).

An addition embodiment of the present invention may operate post flight to ensure the aircraft is ready for the next dispatch operation. In embodiments, should monitor 170 recognize a lost instance of HUD2 144 during flight, system 200 may record that information and remain idle until the aircraft reaches a previously defined non-critical phase of flight (e.g., after shutdown with the parking brake set). At this point, system 200 may implement the second schedule of dispatch critical application instances to regain the lost HUD2 144 and allow the aircraft to timely dispatch on the next operation.

In an additional example, should system 200 be required to implement the second schedule of application instances, system 200 may attempt to regain the first schedule upon reaching a non-critical phase of operation (e.g., shutdown). In addition, system 200 may enact a communications interface to communicate a history of implementation operations with a maintenance organization.

It is contemplated herein; system 200 may operate to ensure redundant copies of an application instance are available to a variety of applications. Systems requiring a plurality of application instances configurable under a specific set of constraints and rules may function within the scope of the present invention. Vehicles such as aircraft, automobiles, transportation trucks, and trains which require a minimum system configuration before departure may benefit from embodiments herein.

In a further example of an application of the present invention, financial systems requiring redundant instances for dual/triple path communication security may benefit from embodiments disclosed herein. System 200 may predefine a schedule of functions and implement the predefined schedule as required transitioning from a first pre-defined schedule of functions to a second pre-defined schedule of functions. In this manner, system 200 performs no dynamic scheduling of resources.

It is contemplated herein; system 200 may reach a balance in offering a specific number of alternate schedules implemented to ensure dispatch critical instances are available. Such a balance may include variables such as cost, a desired number of onboard processors, and a desired form factor of employed components.

Figure 11:
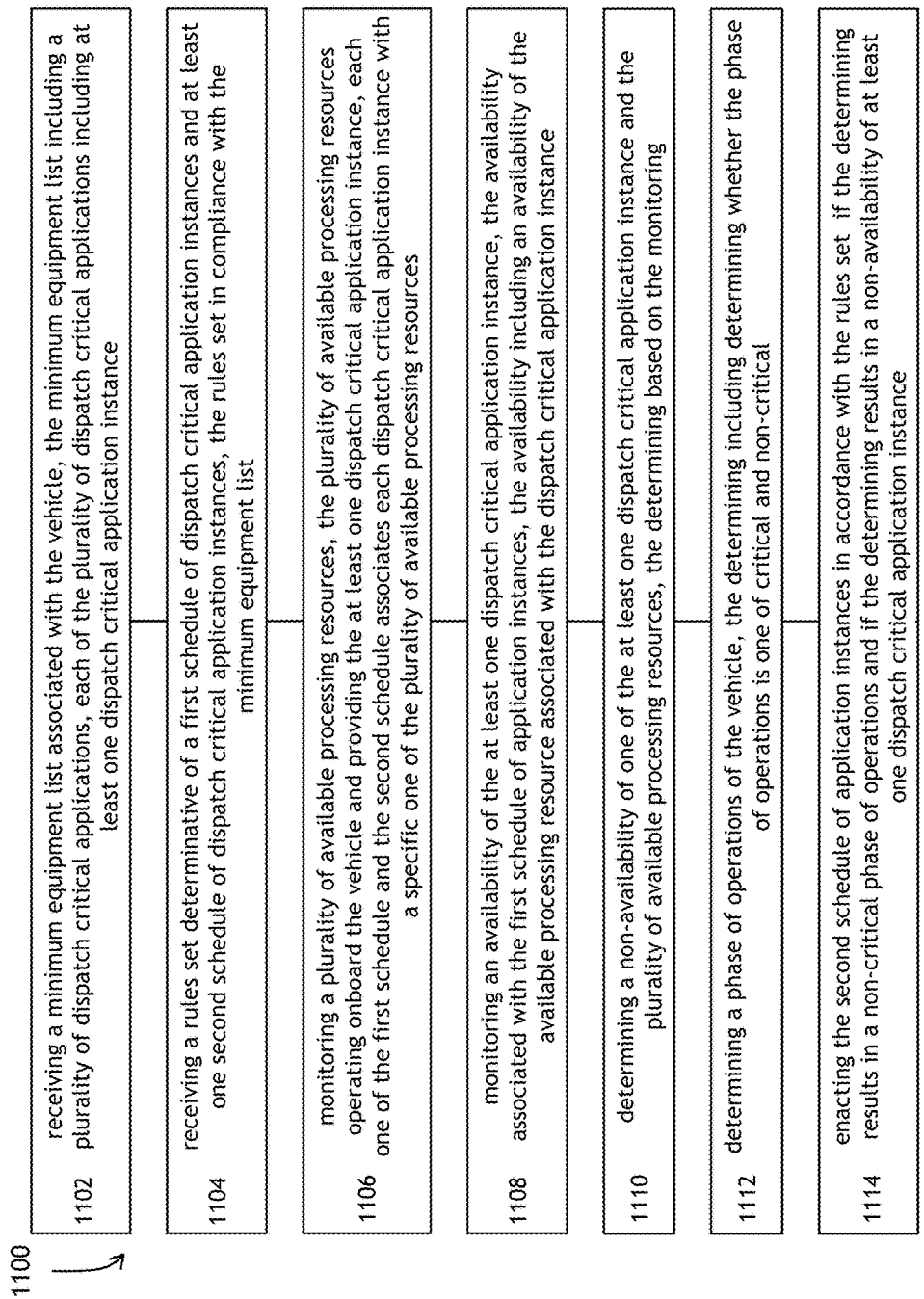
FIG. 11 is a flow diagram of a method for enhanced dispatch in accordance with one embodiment of the present invention.

Referring to FIG. 11, a flow diagram of a method for enhanced dispatch in accordance with one embodiment of the present invention is shown. Method 1100 may begin at step 1102 with receiving a minimum equipment list associated with the vehicle, the minimum equipment list including a plurality of dispatch critical applications, each of the plurality of dispatch critical applications including at least one dispatch critical application instance, and at step 1104 with receiving a rules set determinative of a first schedule of dispatch critical application instances and at least one second schedule of dispatch critical application instances, the rules set in compliance with the minimum equipment list. Method 1100 may continue at step 1106 with monitoring a plurality of available processing resources, the plurality of available processing resources operating onboard the vehicle and providing the at least one dispatch critical application instance, each one of the first schedule and the second schedule associates each dispatch critical application instance with a specific one of the plurality of available processing resources, and at step 1108 with monitoring an availability of the at least one dispatch critical application instance, the availability associated with the first schedule of application instances, the availability including an availability of the available processing resource associated with the dispatch critical application instance, and at step 1110 with determining a non-availability of one of the at least one dispatch critical application instance and the plurality of available processing resources, the determining based on the monitoring, and at step 1112 with determining a phase of operations of the vehicle, the determining including determining whether the phase of operations is one of critical and non-critical. Method 1100 may conclude at step 1114 with enacting the second schedule of application instances in accordance with the rules set if the determining results in a non-critical phase of operations and if the determining results in a non-availability of at least one dispatch critical application instance.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. ALL changes which come within the meaning and range of equivalency of the claims are to be embraced within their scope.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. In embodiments, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/ converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A method for enhanced dispatch of an aircraft, comprising:

receiving a minimum equipment list associated with the aircraft, the minimum equipment list including a plurality of dispatch critical applications, each of the plurality of dispatch critical applications including at least one dispatch critical application instance;

receiving a rules set determinative of a first schedule of dispatch critical application instances and at least one second schedule of dispatch critical application instances, the rules set in compliance with the minimum equipment list;

monitoring a plurality of available processing resources associated with at least one processor of at least one integrated modular avionics, wherein the at least one processor operates onboard the aircraft and provides each of the at least one dispatch critical application instance, each available processing resource associated with a respective dispatch critical application instance of the first schedule and the at least one second schedule;

monitoring each available processing resource associated with the respective dispatch critical application instance of the first schedule and the at least one second schedule;

determining a non-availability of at least one of the at least one dispatch critical application instance based at least on monitoring the plurality of the available processing resources associated with the at least one processor and monitoring each available processing resource associated with the respective dispatch critical application instance of the first schedule;

determining that a phase of operations of the aircraft is a non-critical phase of operations;

enacting at least one of the at least one second schedule of the dispatch critical application instances in accordance with the rules set upon determining that the phase of operations of the aircraft is the non-critical phase of operations and upon determining the non-availability of the at least one of the at least one dispatch critical application instance; and upon enacting the at least one of the at least one second schedule of dispatch critical application instances, statically allocating processing resources to regain functionality of one or more determined-to-be non-available dispatch critical application instances of the at least one dispatch critical application instance.

2. The method for enhanced dispatch of the aircraft of claim 1, wherein at least one of the at least one dispatch critical application instance is associated with at least one of a primary flight display, a systems management display, a stores management display, a navigation display, an engine display, a crew alerting system, a flight envelope protection system, a flight control system, a flight augmentation system, a flight management system, a navigation system, and a heads up display.

3. The method for enhanced dispatch of the aircraft of claim 1, further comprising monitoring at least one of a health management system, a scheduling system, and a power management system.

4. The method for enhanced dispatch of the aircraft of claim 1, wherein the first and second schedules of dispatch critical application instances further comprise a specific dispatch critical application instance associated with a specific available processing resource.

5. The method for enhanced dispatch of the aircraft of claim 1, wherein the non-critical phase of operations is one of: when the aircraft is above 10,000 feet mean sea level, over friendly territory, and before a secure connection is established.

6. The method for enhanced dispatch of the aircraft of claim 1, further comprising outputting a notification to a maintenance provider upon enacting the at least one of the at least one second schedule of dispatch critical application instance.

7. A system for enhanced dispatch of an aircraft, comprising:
a memory; and
one or more processors communicatively coupled to the memory, the one or more processors configured for:
receiving a minimum equipment list associated with the aircraft, the minimum equipment list including a plurality of dispatch critical applications, each of the plurality of dispatch critical applications including at least one dispatch critical application instance;
receiving a rules set determinative of a first schedule of dispatch critical application instances and at least one second schedule of dispatch critical application instances, the rules set in compliance with the minimum equipment list;
monitoring a plurality of available processing resources associated with at least one processor of at least one integrated modular avionics, wherein the at least one processor operates onboard the aircraft and provides each of the at least one dispatch critical application instance, each available processing resource associated with a respective dispatch critical application instance of the first schedule and the at least one second schedule;
monitoring each available processing resource associated with the respective dispatch critical application instance of the first schedule and the at least one second schedule;
determining a non-availability of at least one of the at least one dispatch critical application instance based at least on monitoring the plurality of the available processing resources associated with the at least one processor and monitoring each available processing resource associated with the respective dispatch critical application instance of the first schedule;
determining that a phase of operations of the aircraft is a non-critical phase of operations;
enacting at least one of the at least one second schedule of the dispatch critical application instances in accordance with the rules set upon determining that the phase of operations of the aircraft is the non-critical phase of operations and upon determining the non-availability of the at least one of the at least one dispatch critical application instance; and
upon enacting the at least one of the at least one second schedule of dispatch critical application instances, statically allocating processing resources to regain functionality of one or more determined-to-be non-available dispatch critical application instances of the at least one dispatch critical application instance.

8. The system for enhanced dispatch of the aircraft of claim 7, wherein at least one of the at least one dispatch critical application instance is associated with at least one of a primary flight display, a systems management display, a stores management display, a navigation display, an engine display, a crew alerting system, a flight envelope protection system, a flight control system, a flight augmentation system, a flight management system, a navigation system, and a heads up display.

9. The system for enhanced dispatch of the aircraft of claim 7, wherein the one or more processors are further configured for monitoring at least one of a health management system, a scheduling system, and a power management system.

10. The system for enhanced dispatch of the aircraft of claim 7, wherein the first and second schedules of dispatch critical application instances further comprise a specific dispatch critical application instance associated with a specific available processing resource.

11. The system for enhanced dispatch of the aircraft of claim 7, wherein the non-critical phase of operations is one of: when the aircraft is stationary, above 10,000 feet mean sea level, over friendly territory, and before a secure connection is established.

12. The system for enhanced dispatch of the aircraft of claim 7, wherein the one or more processors are further configured for outputting a notification to a maintenance provider upon enacting the at least one of the at least one second schedule of dispatch critical application instance.

13. A method for reliable operation of an aircraft system, comprising:
receiving a minimum equipment list associated with the aircraft, the minimum equipment list including a plurality of operationally critical applications, each of the plurality of operationally critical applications including at least one operationally critical application instance;
receiving a rules set determinative of a first schedule of operationally critical application instances and at least one second schedule of operationally critical application instances, the rules set in compliance with the minimum equipment list;
monitoring a plurality of available processing resources associated with at least one processor of at least one integrated modular avionics, wherein the at least one processor operates onboard the aircraft and provides each of the at least one operationally critical application instance, each available processing resource associated with a respective operationally critical application instance of the first schedule and the at least one second schedule;
monitoring each available processing resource associated with the respective operationally critical application instance of the first schedule and the at least one second schedule;
determining a non-availability of at least one of the at least one operationally critical application instance based at least on monitoring the plurality of the available processing resources associated with the at least one processor and monitoring each available processing resource associated with the respective operationally critical application instance of the first schedule;
determining that a phase of operations of the aircraft is a non-critical phase of operations;
enacting at least one of the at least one second schedule of the operationally critical application instances in accordance with the rules set upon determining that the phase of operations of the aircraft is the non-critical phase of operations and upon determining the non-availability of the at least one of the at least one operationally critical application instance; and upon enacting the at least one of the at least one second schedule of operationally critical application instances, statically allocating processing resources to regain functionality of one or more determined-to-be non-available operationally critical application instances of the at least one operationally critical application instance.

14. The method for reliable operation of the aircraft system of claim 13, wherein one or more of the at least one operationally critical application instance comprises at least one mission critical element of an operation of the aircraft system.

15. The method for reliable operation of the aircraft system of claim 13, further comprising monitoring at least one of a health management system, a scheduling system, and a power management system.

16. The method for reliable operation of the aircraft system of claim 13, wherein the phase of operations of the system is based on a mission of the aircraft system.

17. The method for reliable operation of the aircraft system of claim 13, wherein at least one of the at least one second schedule of operationally critical application instances is a predefined, pre-run-time schedule of operationally critical application instances.

* * * * *